United States Patent [19]

Sawahashi et al.

[11] Patent Number: 5,748,623
[45] Date of Patent: May 5, 1998

[54] CODE DIVISION MULTIPLE ACCESS TRANSMITTER AND RECEIVER

[75] Inventors: Mamoru Sawahashi, Yokosuka; Fumiyuki Adachi, Yokohama, both of Japan

[73] Assignee: NTT Mobile Communications Network, Inc.

[21] Appl. No.: 428,203

[22] PCT Filed: Sep. 2, 1994

[86] PCT No.: PCT/JP94/01450

§ 371 Date: Jun. 5, 1995

§ 102(e) Date: Jun. 5, 1995

[87] PCT Pub. No.: WO95/06987

PCT Pub. Date: Mar. 9, 1995

[30] Foreign Application Priority Data

Sep. 3, 1993 [JP] Japan .................................. 5-219897

[51] Int. Cl.⁶ .................................................. H04B 7/216
[52] U.S. Cl. .................................................. 370/342
[58] Field of Search .............................. 370/18, 20, 69.1,
370/120, 121, 122, 70, 204, 206, 342, 481,
482, 483, 484, 441; 455/192.2; 375/205,
206, 208, 344, 261

[56] References Cited

U.S. PATENT DOCUMENTS

| | | | |
|---|---|---|---|
| 4,630,283 | 12/1986 | Schiff | 375/205 |
| 5,267,260 | 11/1993 | Lee | 375/205 |
| 5,271,034 | 12/1993 | Abaunza | 375/200 |
| 5,471,497 | 11/1995 | Zehavi | 375/200 |
| 5,488,629 | 1/1996 | Takahashi et al. | 375/206 |

FOREIGN PATENT DOCUMENTS

| | | | |
|---|---|---|---|
| 0280161 | 8/1988 | European Pat. Off. | H01J 1/05 |
| 4041632 | 7/1992 | Germany | H04N 7/00 |
| 63-74235 | 4/1988 | Japan | H04J 13/00 |
| 4-123636 | 4/1992 | Japan | H04L 27/20 |
| U4-110038 | 9/1992 | Japan | H04J 13/00 |
| 5-268189 | 10/1994 | Japan | H04J 13/00 |

*Primary Examiner*—Douglas W. Olms
*Assistant Examiner*—Ajit Patel
*Attorney, Agent, or Firm*—George P. Hoare, Jr.; Rogers & Wells

[57] ABSTRACT

A code division multiple access transmitter and receiver that makes it possible to reduce its size by designating a spreading code and a carrier frequency in a baseband. It includes a primary modulator for performing primary modulation by transmission information, thereby producing a primary modulated I signal and a primary modulated Q signal, a spreading code generator for generating a spreading code with a frequency higher than a rate of the transmission information, a secondary modulator for spread-modulating the primary modulated I signal and Q signal by using the spreading code, thereby outputting spread I-channel data and spread Q-channel data, a frequency offset circuit for offsetting the center frequency of the spread I-channel data and Q-channel data by a designated offset frequency, thereby outputting frequency offset data, and a transmitting circuit for converting the frequency offset data into a transmitted signal.

12 Claims, 9 Drawing Sheets

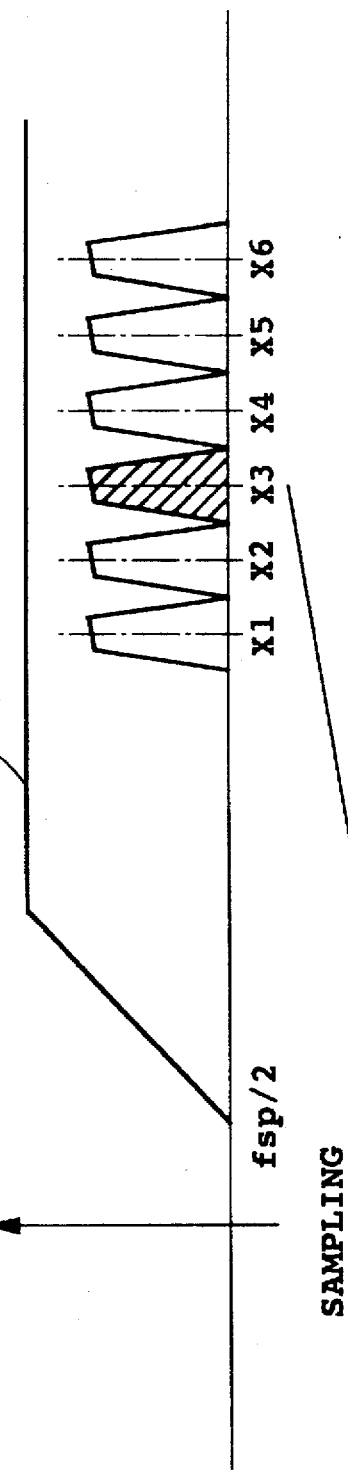
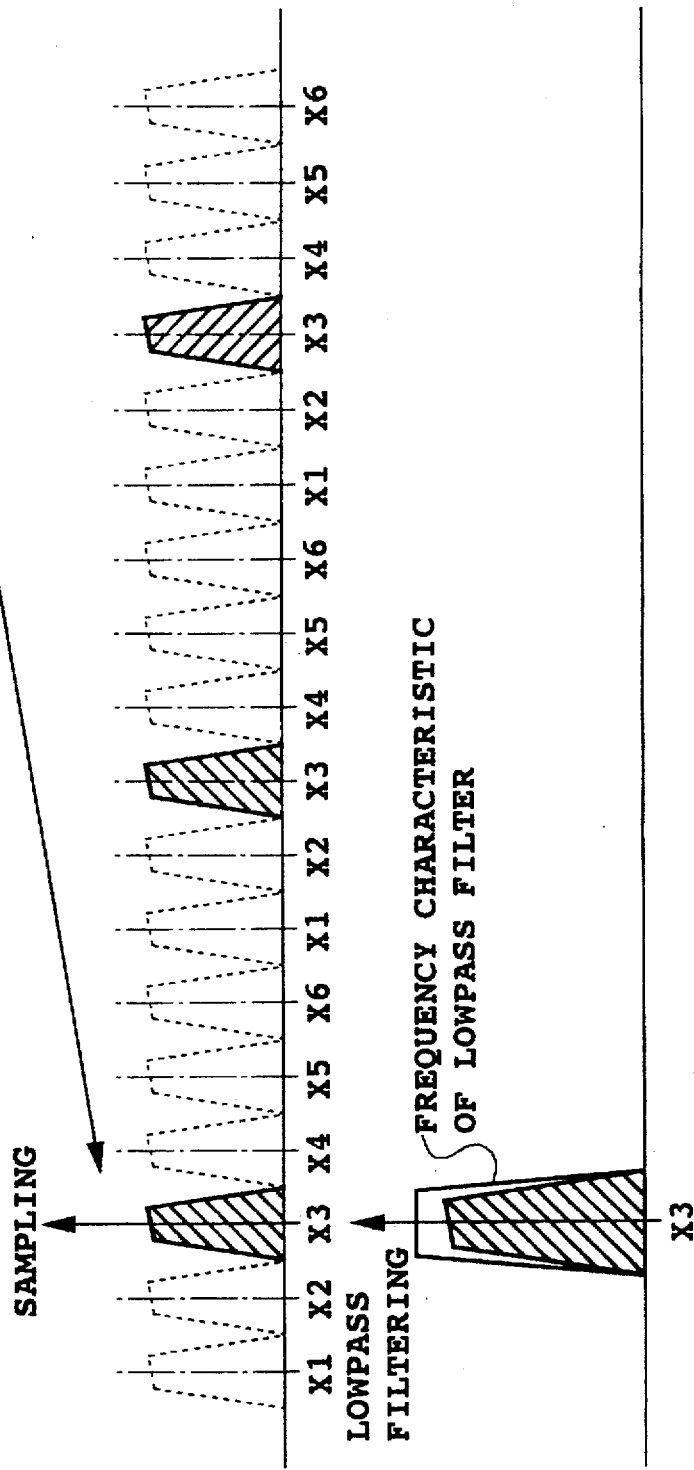
FIG.9(A)
FIG.9(B)
FIG.9(C)

5,748,623

CODE DIVISION MULTIPLE ACCESS TRANSMITTER AND RECEIVER

TECHNICAL FIELD

The present invention relates to a transmitter and a receiver used in mobile communications based on a code division multiple access (CDMA) system.

BACKGROUND ART

The following three systems are typical access systems in mobile communications:

(1) SCPC/FDMA (Single Channel Per Carrier/Frequency Division Multiple Access) system.

(2) TDMA/FDMA (Time Division Multiple Access/Frequency Division Multiple Access) system.

(3) CDMA system.

In the SCPC/FDMA system, a user occupies a channel associated with a carrier. In TDMA/FDMA system, a carrier is time-divided and each time slot is assigned to a user. In these systems, a base station communicates with a mobile station through an assigned frequency, or an assigned frequency and time slot.

On the other hand, in the CDMA system, the output signal of primary modulation such as QPSK is converted into a wideband signal by secondary modulation using a spreading code, and is transmitted. Since many users share the same carrier, and individual users are identified by spreading codes, this system is referred to as a spread spectrum multiple access system. The CDMA system is further classified into a direct sequence (DS) system and a frequency hopping (FH) system. The direct sequence system is characterized in that the primary modulated output signal is spread by using a high rate spreading code. On the other hand, the frequency hopping system resolves one symbol into elements called chips, and translates the individual chips into signals of different center frequencies at a high rate. Since the FH system is difficult to implement in the state of the art, the DS system is usually used.

At a spread spectrum RF receiving end, a received signal is demodulated in the order opposite to that at the transmitting end. Specifically, secondary demodulation which converts the wide-band received signal into a narrow-band signal by despeading using a spreading code is followed by primary demodulation which recovers source information symbols by synchronous detection or delay detection. The despreading at the receiving end is carried out by detecting correlation between the received signal and the spreading code corresponding to the desired signal wave. Thus, the signal that has been spread by the spreading code is despread.

In the DS system, each bit (symbol) of binary information is represented by a code sequence consisting of so-called chips with an interval much shorter than the interval of the bit, and the number of chips per symbol is called a processing gain. This is because the bandwidth of the transmitted signal is expanded by a factor of the processing gain. Denoting the processing gain as PG, $2^{PG}$ PN (Pseudo-Noise) code sequences are generated, and they are the candidates of the spreading codes. However, not all the PN codes can be used as the spreading code because of some correlations between them: Only a limited number of the PN codes having small correlations can be used as the spreading codes. As a result, the actual capacity in terms of the number of users per carrier is reduced to a fraction of the processing gain. Thus, a plurality of carriers must be used in a CDMA cell of a large capacity in terms of the number of subscribers. In other words, both the spreading code and the carrier frequency must be designated to transmit and receive a desired signal.

FIG. 1 is a block diagram showing a conventional transmitter, in which both a spreading code and a carrier must be designated. In this figure, a transmitted information signal applied to an input terminal 11 is BPSK, QPSK, or GMSK (Gaussian filtered Minimum Shift Keying) modulated by a primary modulator 12, and then supplied to a secondary modulator 13 as an I-channel signal and a Q-channel signal (in the BPSK, the in-phase signal I and the quadrature signal Q are the same). On the other hand, a spreading code generator 14 generates the spreading code associated with a desired received signal, and supplies it to the secondary modulator 13. The spreading code generator 14 has a memory circuit for storing spreading codes, and a function for selectively reading them. The secondary modulator 13 multiplies the spreading code with the I-channel signal and the Q-channel signal in the form of a complex number, thereby carrying out the secondary modulation.

The I-channel data and Q-channel data with the bandwidth expanded by the secondary modulation are converted into analog signals by D/A converters 15 and 16, respectively. The I-channel analog signal and the Q-channel analog signal outputted from the D/A converters 15 and 16 are supplied to a quadrature modulator 17 that quadrature-modulates an IF (intermediate frequency) carrier. The quadrature-modulated output is supplied to a frequency converter 19 through a bandpass filter 18. The frequency converter 19 converts an RF (radio frequency) signal fed from a frequency synthesizer 21 to an RF modulated signal by multiplying the RF signal with the quadrature-modulated IF signal, and supplies the modulated signal to a bandpass filer 22. The bandpass filter 22 limits the passband of the modulated signal, and supplies it to a power amplifier 23. The power amplifier 23 power-amplifies the RF modulated signal, and transmits it through an antenna.

FIG. 2 is a block diagram showing a conventional receiver corresponding to the transmitter. A received signal applied to an input terminal 31 is supplied to a frequency converter 33 through a bandpass filter 32. The frequency converter 33 frequency-converts the received signal into an IF signal using the local signal from a frequency synthesizer 34. The IF signal is supplied to a quadrature detector 37 after its bandwidth is limited by a bandpass filter 35 and its level is made nearly constant by an AGC circuit 36. The quadrature detector 37 quadrature-detects the IF signal, and outputs a baseband I-channel signal and a baseband Q-channel signal. The I-channel signal and Q-channel signal are converted into digital signals by A/D converters 38 and 39, and then supplied to a correlation detector 41.

The correlation detector 41 despreads the digital signals into narrow band signals, and supplies them to a demodulator 42. The demodulator 42 primary-demodulates the narrow band signals using synchronous detection or delay detection, thereby recovering the source transmission information. Although passive devices such as a surface acoustic wave convolver might be employed as the correlation detector 41, matched filters or a sliding correlator is practically employed considering downsizing, or code multiple. They carry out the digital signal processing in the baseband region.

The foregoing conventional transmitter generates a designated spreading code with the spreading code generator 14, and the receiver despreads the spread spectrum signal with the correlation detector 41 by using the designated spreading code. In addition, the frequency of the output signal is selected by the frequency synthesizers 21 and 34.

Thus, in the conventional CDMA transmitter and receiver, both the spreading code and the carrier frequency must be designated simultaneously. In this case, designation of a spreading code can be achieved in a time sharing fashion by storing the spreading codes in a memory because it is performed by a digital signal processing circuit in a baseband. Since memories are maintenance free and appropriate for downsizing, they are preferably applied to RF systems that demand these features. On the other hand, since the designation of the carrier is performed by the frequency synthesizer in the RF band, it is difficult to realize maintenance free and downsizing. For example, although the processing gain of 256 requires only a few carriers at most considering the capacity in terms of the number of subscribers per cell, a synthesizer for switching the carriers, or the same number of local oscillators as the number of carriers must be provided, and this will prevent downsizing.

DISCLOSURE OF THE INVENTION

Therefore, an object of the present invention is to provide a CDMA transmitter and receiver that can implement a downsized and maintenance free device.

Another object of the present invention is to provide a CDMA transmitter and receiver that can designate both the spreading code and carrier by a digital signal in a baseband region.

In a first aspect of the present invention, there is provided a code division multiple access transmitter comprising:

a primary modulator for carrying out primary modulation of transmission information, thereby generating a primary modulated I (In-phase) signal and a primary modulated Q (Quadrature) signal;

spreading code generating means for generating a spreading code which corresponds to a channel, and has a frequency higher than a rate of the transmission information;

a secondary modulator for performing spread modulation of the primary modulated I signal and the primary modulated Q signal using the spreading code, thereby outputting spread I-channel data and spread Q-channel data;

a frequency offset circuit for offsetting a center frequency of the spread I-channel data and of the spread Q channel data by a designated offset frequency, thereby outputting frequency offset data; and a transmitting circuit for converting the frequency offset data into a transmitted signal.

The frequency offset circuit may comprise:

a first signal generator for generating a cosine wave of a frequency corresponding to the designated offset frequency;

a second signal generator for generating a sine wave of the frequency corresponding to the designated offset frequency;

a first multiplier for multiplying the spread I-channel data by the cosine wave;

a second multiplier for multiplying the spread Q-channel data by the sine wave; and a first adder for summing an output of the first multiplier and an output of the second multiplier.

The transmitting circuit may comprise a D/A converter for converting the frequency offset data into an analog signal, and a frequency converter for converting the analog signal into the transmitted signal.

The frequency offset circuit may comprise:

a first signal generator for generating a cosine wave of a frequency corresponding to the designated offset frequency;

a second signal generator for generating a sine wave of the frequency corresponding to the designated offset frequency;

a first multiplier for multiplying the spread I-channel data by the cosine wave;

a second multiplier for multiplying the spread Q-channel data by the sine wave;

a third multiplier for multiplying the spread I-channel data by the sine wave;

a fourth multiplier for multiplying the spread Q-channel signal by the cosine wave;

a first adder for adding an output of the first multiplier and an output of the second multiplier; and a second adder for adding an output of the third multiplier and an output of the fourth multiplier, thereby carrying out a complex multiplication of the spread I-channel data and the Q-channel data with the cosine wave and the sine wave, and outputting frequency offset I-channel data and frequency offset Q-channel data.

The frequency offset circuit may comprise:

a first memory circuit for storing a product of the spread I-channel data and a cosine wave of a frequency corresponding to the designated offset frequency;

a second memory circuit for storing a product of the spread Q-channel data and a sine wave of the frequency corresponding to the designated offset frequency;

a third memory circuit for storing a product of the spread I-channel data and the sine wave;

a fourth memory circuit for storing a product of the spread Q-channel data and the cosine wave;

a first adder for adding data read from the first memory circuit and data read from the second memory circuit; and a second adder for adding data read from the third memory circuit and data read from the fourth memory circuit;

thereby carrying out a complex multiplication of the spread I-channel data and the Q-channel data with the cosine wave and the sine wave, and outputting frequency offset I-channel data and frequency offset Q-channel data.

The frequency offset circuit may comprise:

a first memory circuit for storing a sum of a product of the spread I-channel data and a cosine wave of a frequency corresponding to the designated offset frequency, and a product of the spread Q-channel data and a sine wave of the frequency corresponding to the designated offset frequency; and a second memory circuit for storing a sum of a product of the spread I-channel data and the sine wave, and a product of the spread Q-channel data and the cosine wave, thereby carrying out a complex multiplication of the spread I-channel data and the Q-channel data with the cosine wave and the sine wave, and outputting frequency offset I-channel data and frequency offset Q-channel data.

The transmitter circuit may comprise D/A converters for converting the frequency offset I-channel data and the frequency offset Q-channel data into analog signals, a quadrature modulator for quadrature-modulating a carrier by an analog I-channel signal and an analog Q-channel signal outputted from the D/A converters, and a frequency converter for converting an output signal of the quadrature modulator into the transmitted signal.

In a second aspect of the present invention, there is provided a code division multiple access receiver comprising:

a first frequency converter for frequency-converting a received signal into an IF (Intermediate Frequency) signal;

a quadrature detector for converting the IF signal into an I-channel baseband signal and a Q-channel baseband signal;

A/D converters for converting the I-channel baseband signal and the Q-channel baseband signal into digital signals;

a second frequency converter for converting an I-channel digital signal and a Q-channel digital signal outputted from the A/D converters into signals with a zero center frequency using a local signal of a designated offset frequency, a center frequency of the I-channel digital signal and of the Q-channel digital signal outputted from the A/D converters being offset;

a correlation detector for correlation-detecting output signals of the second frequency converter; and a demodulator for demodulating output signals of the correlation detector.

The second frequency converter may comprise:

a first signal generator for generating a cosine wave of the designated offset frequency;

a second signal generator for generating a sine wave of the designated offset frequency;

a first multiplier for multiplying the cosine wave with the I-channel baseband signal converted into the digital signal; and a second multiplier for multiplying the sine wave with the Q-channel baseband signal converted into the digital signal.

The second frequency converter may comprise lowpass filters for low-passing outputs of the first multiplier and the second multiplier.

The second frequency converter may comprise an automatic frequency control circuit connected to outputs of the first multiplier and the second multiplier.

The second frequency converter may comprise:

a low-suppress filter for suppressing low-frequency components of outputs of the quadrature detector;

sampling means for sampling outputs of the low-suppress filter at a clock frequency corresponding to a designated offset frequency; and a lowpass filter that low-passes outputs of the sampling means.

In a third aspect of the present invention, there is provided a code division multiple access system including a code division multiple access transmitter and a code division multiple access receiver, the code division multiple access transmitter comprising:

a primary modulator for carrying out primary modulation of transmission information, thereby generating a primary modulated I (In-phase) signal and a primary modulated Q (Quadrature) signal;

spreading code generating means for generating a spreading code which corresponds to a channel, and has a frequency higher than a rate of the transmission information;

a secondary modulator for performing spread modulation of the primary modulated I signal and the primary modulated Q signal using the spreading code, thereby outputting spread I-channel data and spread Q-channel data;

a frequency offset circuit for offsetting a center frequency of the spread I-channel data and of the spread Q channel data by a designated offset frequency, thereby outputting frequency offset data; and a transmitting circuit for converting the frequency offset data into a transmitted signal, the code division multiple access receiver comprising:

a first frequency converter for frequency-converting a received signal into an IF (Intermediate Frequency) signal;

a quadrature detector for converting the IF signal into an I-channel baseband signal and a Q-channel baseband signal;

A/D converters for converting the I-channel baseband signal and the Q-channel baseband signal into digital signals;

a second frequency converter for converting an I-channel digital signal and a Q-channel digital signal outputted from the A/D converters into signals with a zero center frequency using a local signal of a designated offset frequency, a center frequency of the I-channel digital signal and of the Q-channel digital signal outputted from the A/D converters being offset;

a correlation detector for correlation-detecting output signals of the second frequency converter; and a demodulator for demodulating output signals of the correlation detector.

According to the transmitter in accordance with the present invention, designation of the carrier is achieved by designating the offset frequency of the frequency offset circuit. The receiver carries out the designated frequency conversion of the baseband signal in accordance with the offset frequency at the transmitter. This makes it possible to achieve the designation of both carrier and spreading code in the baseband using digital signals, thereby obviating a frequency synthesizer or a plurality of fixed frequency oscillators, and implementing downsized and maintenance free CDMA transmitter and receiver.

BRIEF DESCRIPTION OF THE DRAWINGS

FIG. 9 is a diagram showing frequency characteristics illustrating the operation of the frequency converter 65 when it is composed of a frequency converting filter.

BEST MODE FOR CARRYING OUT THE INVENTION

EMBODIMENT 1

Figure 1:
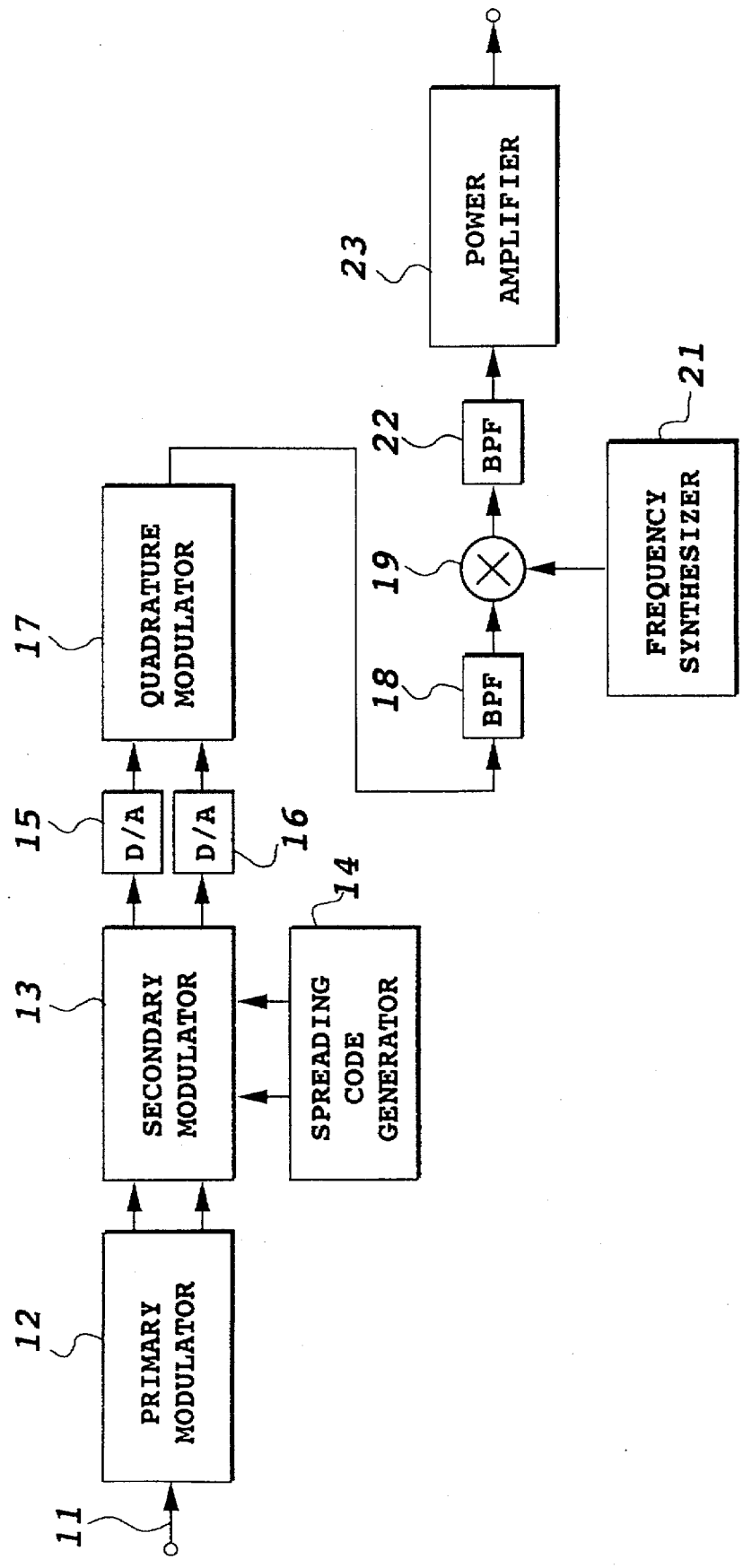
FIG. 1 is a block diagram showing a conventional CDMA transmitter.
Figure 3:
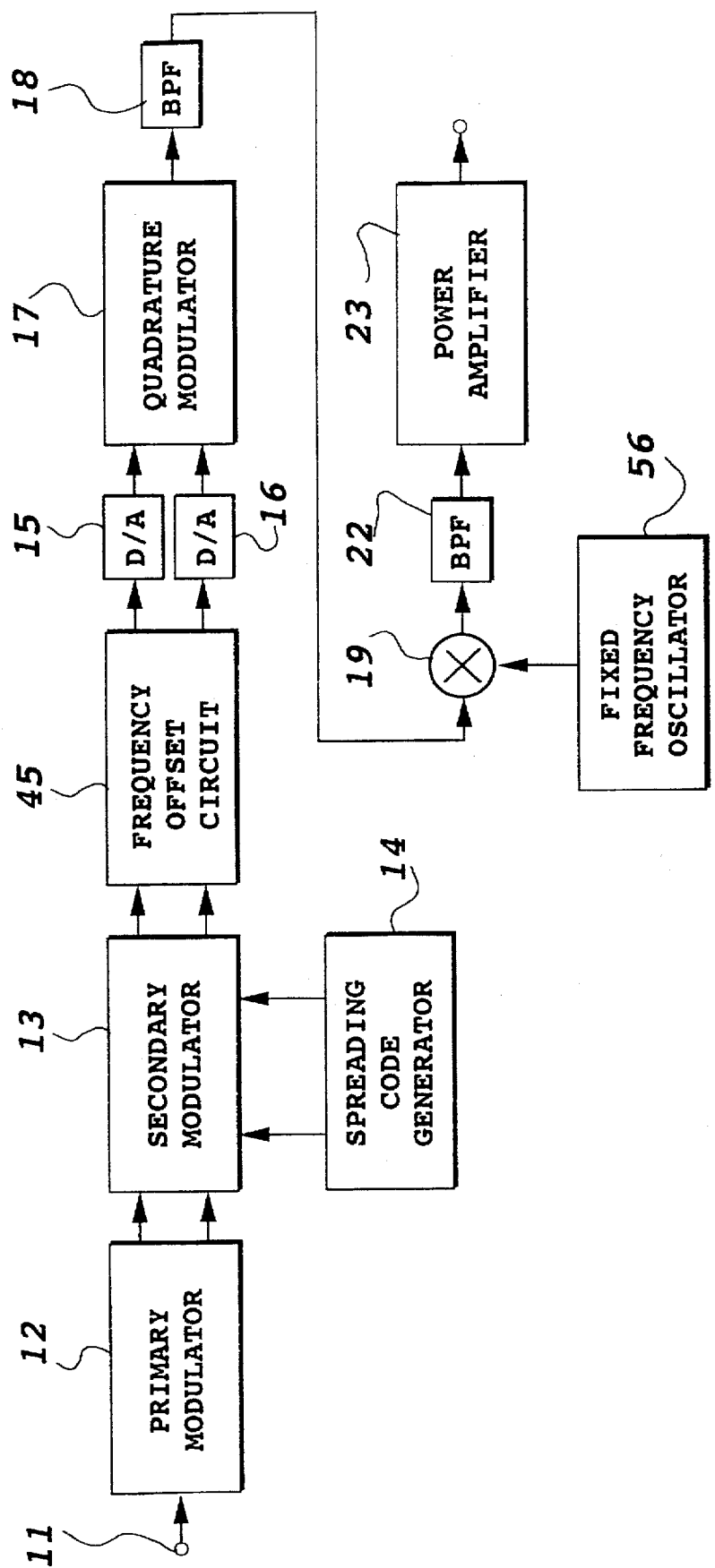
FIG. 3 is a block diagram showing an embodiment of a CDMA transmitter in accordance with the present invention.

FIG. 3 is a block diagram showing an embodiment of a transmitter in accordance with the present invention. The transmitter differs from the conventional transmitter shown in FIG. 1 in the following:

(1) A frequency offset circuit 45 is inserted between the secondary modulator 13 and the D/A converters 15 and 16.

(2) A fixed frequency oscillator 56 is connected to the frequency converter 19 instead of the frequency synthesizer 21.

(3) The bandwidth of the bandpass filters 18 and 22 is set at least the conventional bandwidth multiplied by the number of carriers.

The frequency offset circuit 45 shifts the center frequency of the spread I-channel data and spread Q-channel data outputted from the secondary modulator 13 by a designated offset frequency. An example of the frequency offset circuit is shown in FIG. 4.

Figure 4:
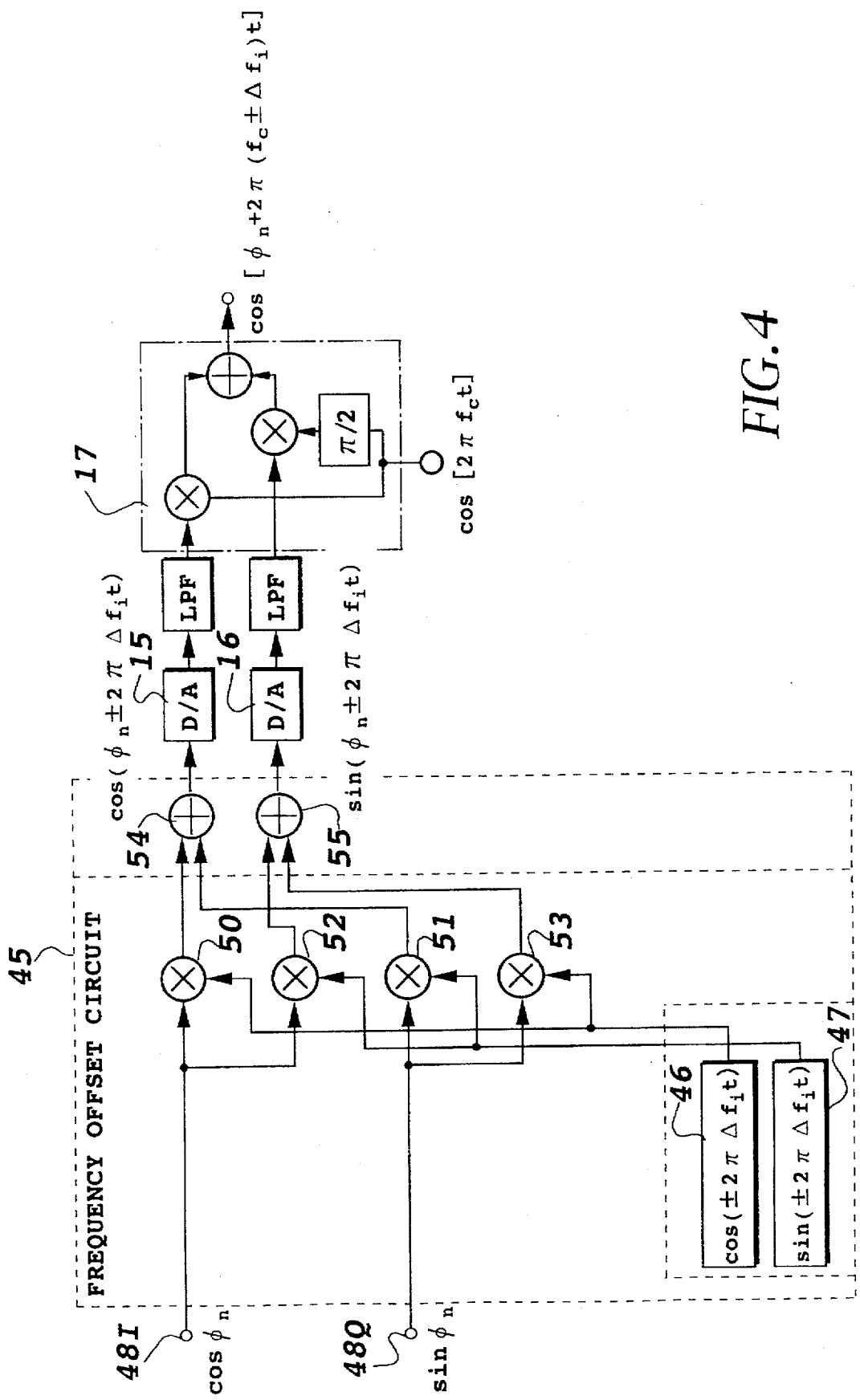
FIG. 4 is a block diagram showing an example of a frequency offset circuit 45 in FIG. 3.

In FIG. 4, the spread I-channel data $\cos\phi_n$ and the spread Q-channel data $\sin\phi_n$ are supplied to multipliers 50 and 52, and 51 and 53, through input terminals 48I and 48Q of the frequency offset circuit 45, respectively. These channel data undergo a complex multiplication, in the multipliers 50–53, with in-phase and quadrature offset frequency signals outputted from signal generators 46 and 47.

More specifically, the signal generator 46 generates a cosine signal $\cos(\pm 2\pi\Delta f_i \cdot t)$ of a designated offset frequency $\Delta f_i$, and supplies it to the multipliers 50 and 53. On the other hand, the signal generator 47 generates a sine signal $\sin(\pm 2\pi\Delta f_i \cdot t)$ of the designated offset frequency $\Delta f_i$, and supplies it to the multipliers 51 and 52. As a result, the multiplier 50 outputs $\cos\phi_n\cos(\pm 2\pi\Delta f_i \cdot t)$, and the multiplier 51 outputs $\sin\phi_n\sin(\pm 2\pi\Delta f_i \cdot t)$. The outputs are summed by an adder 54 which outputs the frequency shifted spread I channel data $\cos(\phi_n \pm 2\pi\Delta f_i \cdot t)$. Likewise, the multiplier 52 outputs $\cos\phi_n\sin(\pm 2\pi\Delta f_i \cdot t)$, and the multiplier 53 outputs $\sin\phi_n\cos(\pm 2\pi\Delta f_i \cdot t)$. The outputs are summed by an adder 55 which outputs the frequency shifted spread Q channel data $\sin(\phi_n \pm 2\pi\Delta f_i \cdot t)$. Thus, the spread channel data which are frequency offset in the baseband region are generated by the complex multiplication of the spread I channel data and the spread Q channel data with the in-phase and quadrature offset frequency signals.

The complex multiplication correspond to a multiplication of the I-channel data and Q-channel data represented by one complex number with the offset frequency signals represented by another complex number. In this case, it should be noted that the sign of the offset frequency $\Delta f_i$ can be inverted by switching $\sin(2\pi\Delta f_i \cdot t)$ with $\sin(-2\pi\Delta f_i \cdot t)$.

The signal generators 46 and 47 can be composed of a ROM storing cosine waves and sine waves. Having stored cosine signals and sine signals of offset frequencies $\Delta f_i$ corresponding to respective designatable carriers, and reading a pair of a cosine signal and a sine signal corresponding to a designated carrier makes it possible to reduce the size of the system.

In addition, the function of the signal generators 46 an 47 and the multipliers 50–53 can be incorporated into a ROM by prestoring the results of the multiplications of the I-channel data and Q-channel data with the offset frequencies, and by reading corresponding waveforms. Such an arrangement can be implemented because the number of the spread I-channel data and spread Q-channel data are limited, for example, to four×the number of spreading codes, in the case of QPSK.

Furthermore, even the adders 54 and 55 can also be incorporated into a ROM by prestoring the frequency shifted in-phase and quadrature components corresponding to the combinations of the spread I-channel data and spread Q-channel data with the offset frequencies.

The frequency offset I-channel and Q-channel data outputted from the frequency offset circuit 45 are converted into analog signals by the D/A converters 15 and 16 as in the conventional system, and are supplied to the quadrature modulator 17 through lowpass filters.

The quadrature modulator 17 quadrature-modulates an IF carrier $\cos 2\pi f_c \cdot t$ by the analog signals. The quadrature-modulated output $\cos\{\phi_n + 2\pi(f_c \pm \Delta f_i)t\}$ is converted into a transmission frequency by the frequency converter 19 using an RF signal fed from the fixed frequency oscillator 56, and is transmitted as a signal $\cos\{\phi_n + 2\pi(f_{ri} \pm \Delta f_i)t\}$. In this case, the center frequency of a carrier i is $f_{ri} \pm \Delta f_i$. In other words, the frequency of the carrier i is offset from the frequency of the RF signal by $\pm \Delta f_i$.

Thus, designating the offset frequency corresponding to the carrier frequency to the frequency offset circuit 45 makes it possible to frequency-offset the baseband signal by that offset frequency. As a result, the frequency of the transmitted signal can be set at the designated carrier frequency.

The system in FIG. 4 can set the offset frequency both in positive and negative directions because it performs a complex multiplication. For example, when the channels 1–8 are each frequency-offset successively by $\Delta f$, the frequency range of the channels 1–8 is from $-4\Delta f$ to $+4\Delta f$ by setting the zero frequency at the center between the channels 4 and 5. In contrast, since the offset frequency must be set in either the positive or negative direction in the case of a real number multiplication, the frequency range of the channels 1–8 becomes 0–8$\Delta f$. Since the clock frequency of the signal processing in the baseband region is determined by the absolute value of the frequency range, the clock frequency associated with the complex number multiplication can be reduce to ½ as compared with that associated with the real number multiplication.

The designated carriers are selected such that no sidebands overlap with each other. In other words, the frequency interval of the designated carriers is made greater than the expanded bandwidth by the code spreading. In addition, the passbands of the bandpass filters 18 and 22 are selected such that they can pass the carriers and their sidebands. For example, when the number of the carriers are three, the passbands of the bandpass filters 18 and 22 of the present embodiment are set at least three times wider than those of the conventional bandpass filters.

EMBODIMENT 2

Although the spread I-channel data and spread Q-channel data undergo a complex multiplication with the frequency offset signals in the first embodiment, an embodiment is not restricted to this. For example, these data can be frequency offset by real number multiplications in the baseband.

Figure 5:
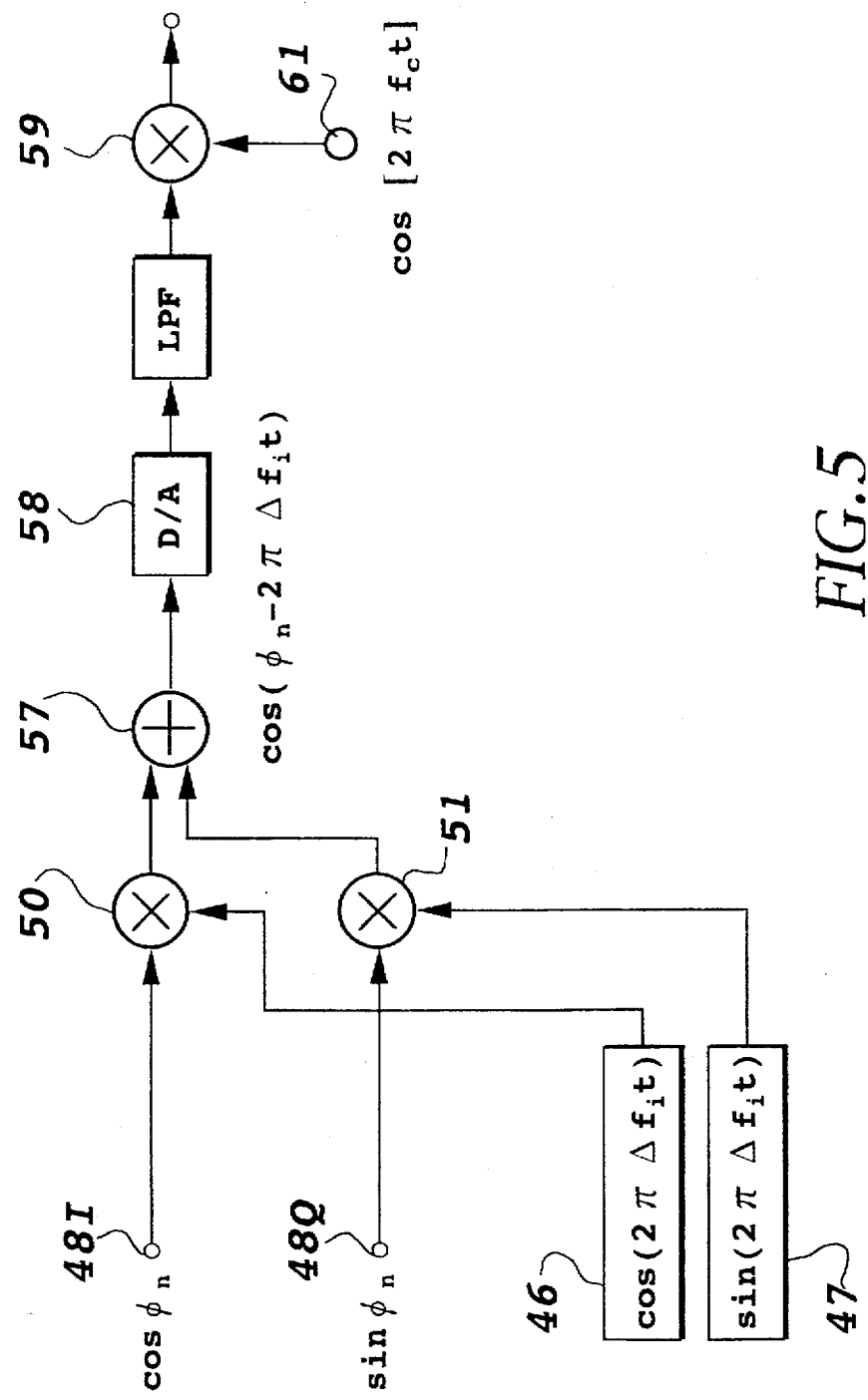
FIG. 5 is a block diagram showing a major portion of another embodiment of a CDMA transmitter in accordance with the present invention.

FIG. 5 is a block diagram showing a major portion of a transmitter with such a function. Signal generators 46 and 47 generate $\cos(2\pi\Delta f_i \cdot t)$ and $\sin(2\pi\Delta f_i \cdot t)$, which are supplied to the multipliers 50 and 51, respectively. The multipliers 50 and 51 multiply these signals with the spread I-channel data and the spread Q-channel data, respectively, and supply the outputs to an adder 57. The adder 57 sums up the supplied signals and outputs the frequency offset signal. The output of the adder 57 is converted into an analog signal by a D/A converter 58, and the analog signal is supplied to a frequency converter 59 through a lowpass filter. The frequency converter 59 converts the analog signal into an IF signal using a signal $\cos 2\pi f_c \cdot t$ from an oscillator 61.

In the present embodiment, the offset frequencies cannot range from the positive to negative domains as in the first embodiment.

EMBODIMENT 3

Figure 2:
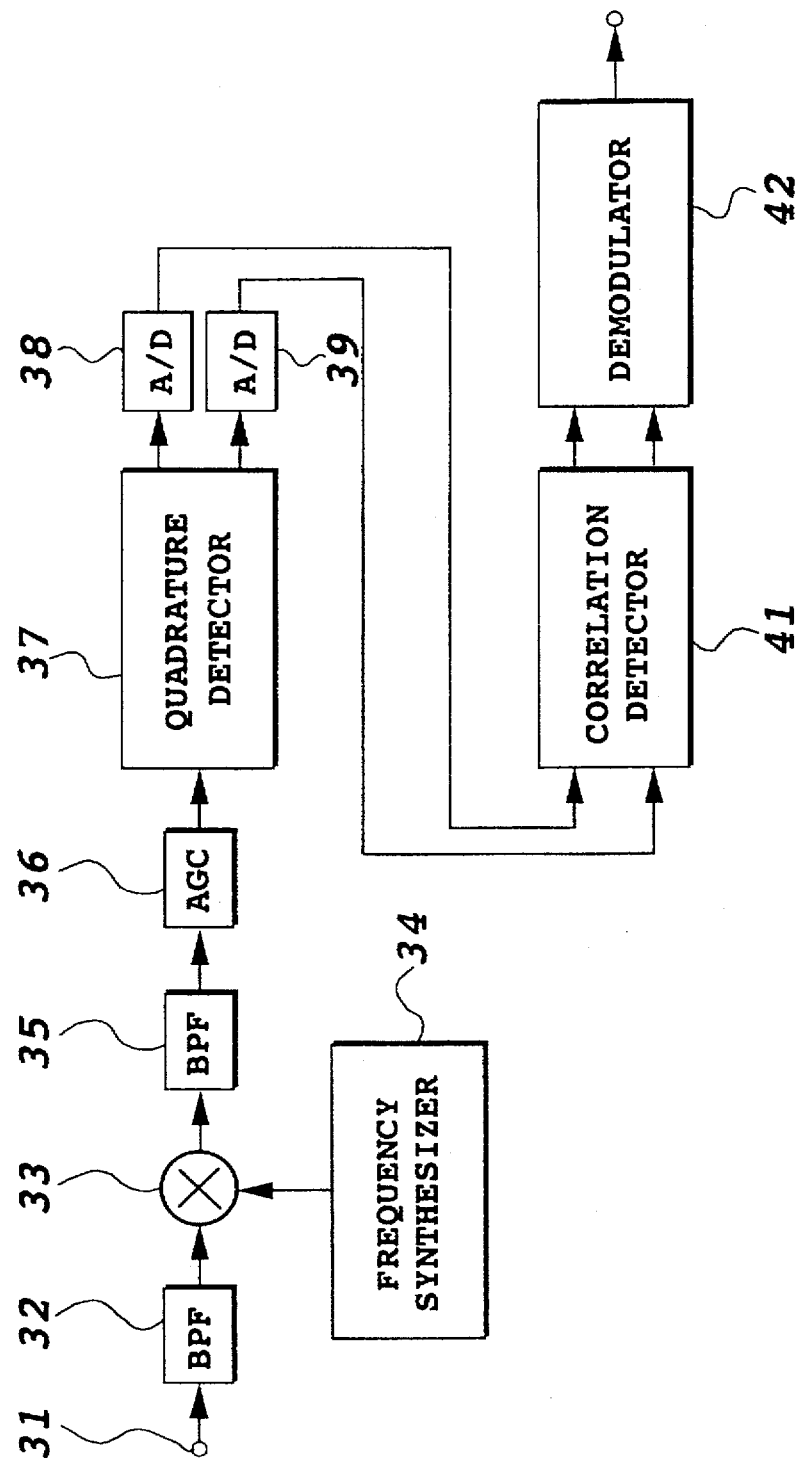
FIG. 2 is a block diagram showing a conventional CDMA receiver.
Figure 6:
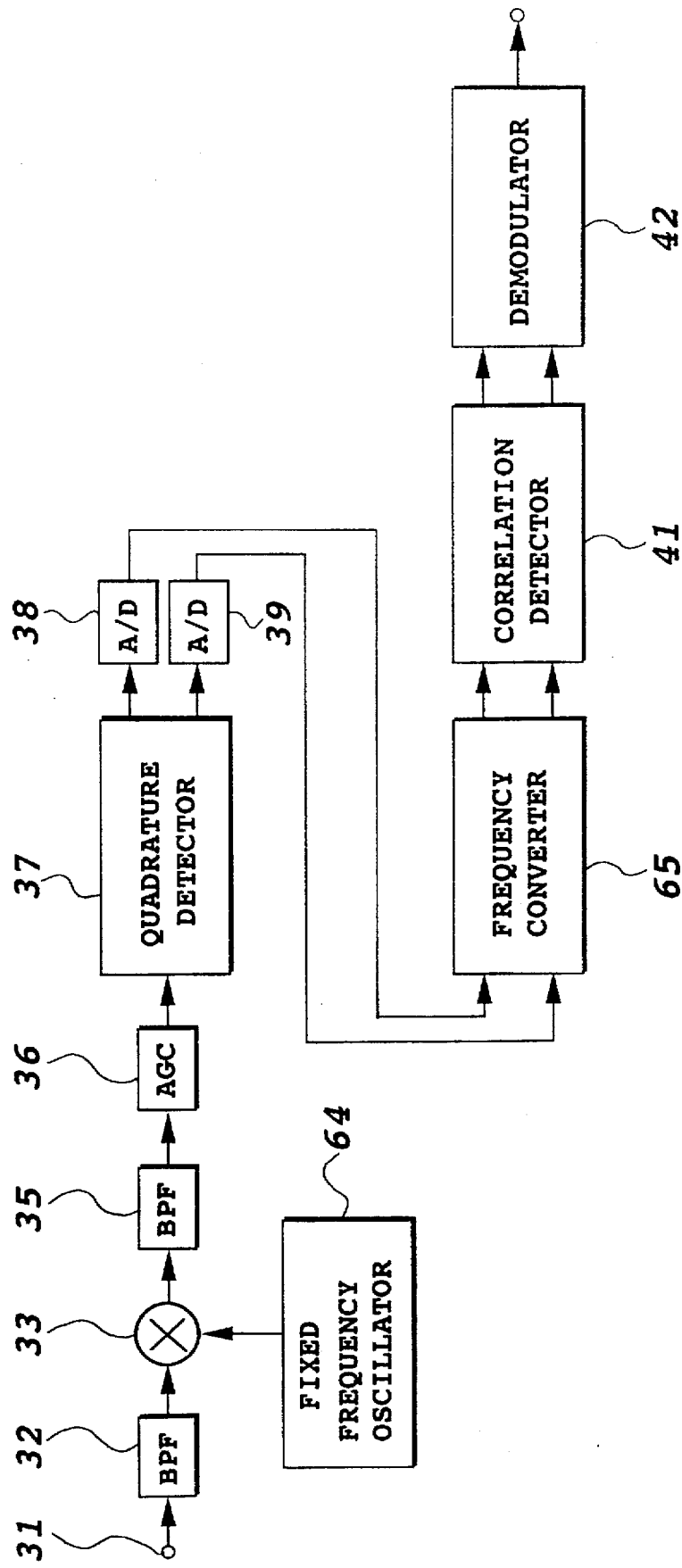
FIG. 6 is a block diagram showing an embodiment of a CDMA receiver in accordance with the present invention.

FIG. 6 is a block diagram showing an embodiment of a receiver in accordance with the present invention. The receiver of FIG. 6 differs from that of FIG. 2 in the following:

(1) A fixed frequency oscillator 64 is provided instead of the frequency synthesizer 34 connected to the frequency converter 33. The frequency converter 33 converts the received signal into an IF signal by using a local oscillation signal from the fixed frequency oscillator 64.

(2) The bandwidths of the bandpass filters 32 and 35 are set as at least the conventional bandwidths multiplied by the number of the carriers.

(3) A frequency converter 65 is inserted between the A/D converters 38 and 39, and the correlation detector 41.

The frequency converter 65 converts the frequency-offset baseband signal into a signal whose center frequency is zero. More specifically, the IF signal outputted from the frequency converter 33 is converted into baseband I-channel and Q channel signals by the quadrature detector 37. In this specification, the baseband signal refers to a signal including no carrier signal component. Specifically, the signals after primary modulation and after spreading are called a baseband signal at the transmitter end, and the signals after quadrature detection and before despreading, and after despreading are called a baseband signal at the receiver end. The A/D converters 38 and 39 convert the signals into digital data, the center frequencies of which are offset by amounts corresponding to the offset frequencies at the transmitter end. The frequency converter 65 converts the baseband signal into a signal with the center frequency of zero, and the offset frequency can be designated by a value corresponding to each carrier signal. The I-channel baseband signal and the Q-channel baseband signal with the center frequency of zero outputted from the frequency converter 65 are converted into a narrow band signal by the correlation detector 41, followed by the demodulation by the demodulator 42.

Figure 7:
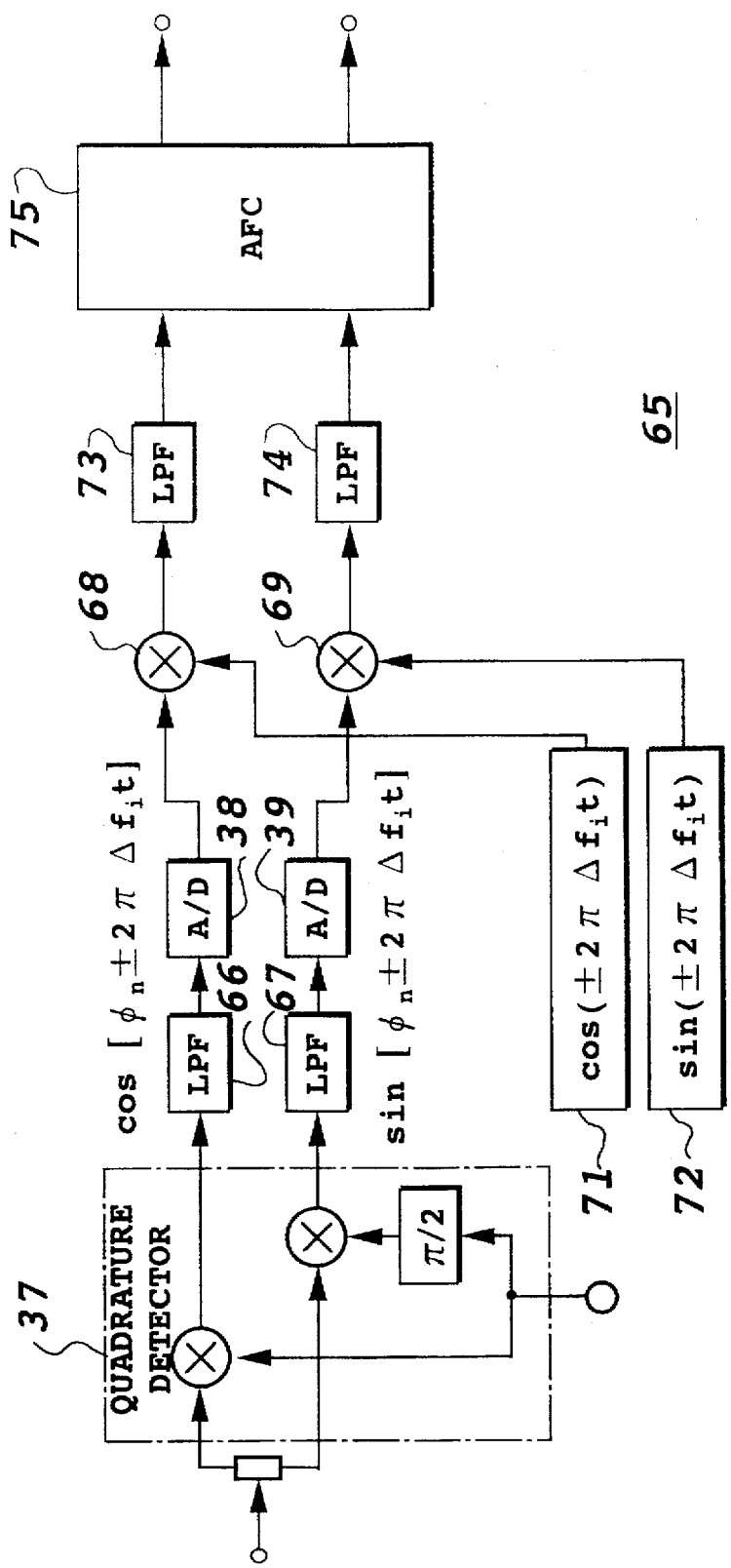
FIG. 7 is a block diagram showing an example of a frequency converter 65 in FIG. 6.

FIG. 7 is a block diagram showing an example of the frequency converter 65 together with the neighboring circuits. The I-channel baseband signal and the Q-channel baseband signal outputted from the quadrature detector 37 are passed through lowpass filters 66 and 67, thereby producing signals $\cos(\phi_n \pm 2\pi\Delta f_i \cdot t)$ and $\sin(\phi_n \pm 2\pi\Delta f_i \cdot t)$. In other words, signals with their frequencies offset by $\pm 2\pi\Delta f_i \cdot t$ are obtained. These signals are converted into digital data by the A/D converters 38 and 39, and are supplied to multipliers 68 and 69, to which local signals with a frequency corresponding to that of the designated carrier are supplied from signal generators 71 and 72. That is, a cosine local signal $\cos(\pm 2\pi\Delta f_i \cdot t)$ is supplied from the signal generator 71 to the multiplier 68, and a sine local signal $\sin(\pm 2\pi\Delta f_i \cdot t)$ is supplied from the signal generator 72 to the multiplier 69. The signal generators 71 and 72 are the same as the signal generators 46 and 47 in FIG. 4.

The I-channel data $\cos\phi_n$ and the Q-channel data $\sin\phi_n$ with the zero center frequency outputted from the multipliers 68 and 69 will include a frequency error and a fixed phase error. This is because the quadrature detector 37 carries out quasi-synchronous quadrature detection. The frequency error and the fixed phase error are supplied to a digital AFC (Automatic Frequency Control) circuit 75 through lowpass filters 73 and 74, and are absorbed by the AFC circuit 75. The output of the AFC circuit 75 is fed to the correlation detector 41 of FIG. 6 so that the transmitted source information is recovered through the same processings as in the conventional system.

The frequency converter 65 is not restricted to the circuit as shown in FIG. 7. For example, a frequency conversion filter may be used which is proposed in The Journal of the Institute of Electronics, Information and Communication Engineers of Japan 94/5 Vol. J77-B-II No. 5 pp. 235-236.

Figure 8:
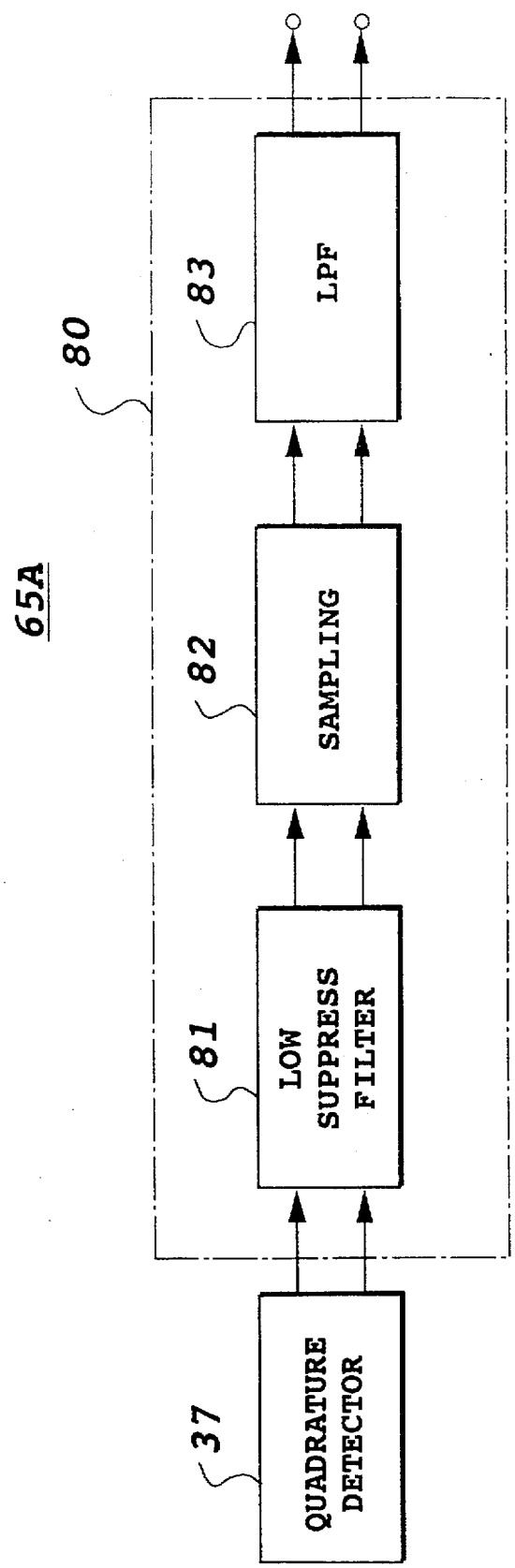
FIG. 8 is a block diagram showing another example of the frequency converter 65 in FIG. 6.

FIG. 8 is a block diagram showing the arrangement of a frequency converter 65A using such a frequency conversion filter 80. The frequency conversion filter 80 has three stages. The first stage, a filter 81, is a low-suppress filter that suppresses low frequency band of the output of the quadrature detector 37, thereby eliminating noise components in the low frequency band. For example, as shown in (A) of FIG. 9, components lower than a signal group are eliminated, the signal group consisting of carriers X1–X6 and their accompanying sideband waves which are spread by code spreading components. The second stage, a filter 82, is a filter that samples the received signal at a predetermined clock frequency. For example, to receive the signal X3 in the signal group X1–X6 in (A) of FIG. 9, the filter 82 samples the output of the low-suppress filter 81 at the center frequency X3. This will convert the signal X3 to a signal whose center frequency is zero as indicated by a shadowed portion in (B) of FIG. 9. The third stage, a filter 83, is a lowpass filter that passes only the component whose center frequency is zero. As a result, only the signal X3 with the zero center frequency is extracted as shown in (C) of FIG. 9. Thus, a desired signal is extracted by selecting a sampling frequency in accordance with a designated carrier.

What is claimed is:

1. A code division multiple access transmitter comprising:
   a primary modulator for carrying out primary modulation of transmission information, thereby generating a primary modulated I (In-phase) signal and a primary modulated Q (Quadrature) signal;
   spreading code generating means for generating a spreading code which corresponds to a channel, and has a frequency higher than a rate of said transmission information;
   a secondary modulator for performing spread modulation of said primary modulated I signal and said primary modulated Q signal using said spreading code, thereby outputting spread I-channel data and spread Q-channel data;
   a frequency offset circuit for offsetting a center frequency of said spread I-channel data and of said spread Q channel data by a designated offset frequency, thereby outputting frequency offset data; and
   a transmitting circuit for converting said frequency offset data into a transmitted signal, wherein said frequency offset circuit comprises:
      a first signal generator for generating a cosine wave of a frequency corresponding to said designated offset frequency;

a second signal generator for generating a sine wave of the frequency corresponding to said designated offset frequency;

a first multiplier for multiplying said spread I-channel data by said cosine wave;

a second multiplier for multiplying said spread Q-channel data by said sine wave;

a first adder for summing an output of said first multiplier and an output of said second multiplier.

2. A code division multiple access transmitter comprising:

a primary modulator for carrying out primary modulation of transmission information, thereby generating a primary modulated I (In-phase) signal and a primary modulated Q (Quadrature) signal;

spreading code generating means for generating a spreading code which corresponds to a channel, and has a frequency higher than a rate of said transmission information;

a secondary modulator for performing spread modulation of said primary modulated I signal and said primary modulated Q signal using said spreading code, thereby outputting spread I-channel data and spread Q-channel data;

a frequency offset circuit for offsetting a center frequency of said spread I-channel data and of said spread Q channel data by a designated offset frequency, thereby outputting frequency offset data; and a transmitting circuit for converting said frequency offset data into a transmitted signal, wherein said frequency offset circuit comprises:

a first signal generator for generating a cosine wave of a frequency corresponding to said designated offset frequency;

a second signal generator for generating a sine wave of the frequency corresponding to said designated offset frequency;

a first multiplier for multiplying said spread I-channel data by said cosine wave;

a second multiplier for multiplying said spread Q-channel data by said sine wave;

a first adder for summing an output of said first multiplier and an output of said second multiplier, wherein said transmitting circuit comprises a D/A converter for converting said frequency offset data into an analog signal, and a frequency converter for converting said analog signal into the transmitted signal.

3. A code division multiple access transmitter comprising:

a primary modulator for carrying out primary modulation of transmission information, thereby generating a primary modulated I (In-phase) signal and a primary modulated Q (Quadrature) signal;

spreading code generating means for generating a spreading code which corresponds to a channel, and has a frequency higher than a rate of said transmission information;

a secondary modulator for performing spread modulation of said primary modulated I signal and said primary modulated Q signal using said spreading code, thereby outputting spread I-channel data and spread Q-channel data;

a frequency offset circuit for offsetting a center frequency of said spread I-channel data and of said spread Q channel data by a designated offset frequency, thereby outputting frequency offset data; and a transmitting circuit for converting said frequency offset data into a transmitted signal, wherein said frequency offset circuit comprises:

a first signal generator for generating a cosine wave of a frequency corresponding to said designated offset frequency;

a second signal generator for generating a sine wave of the frequency corresponding to said designated offset frequency;

a first multiplier for multiplying said spread I-channel data by said cosine wave;

a second multiplier for multiplying said spread Q-channel data by said sine wave;

a third multiplier for multiplying said spread T-channel data by said sine wave;

a fourth multiplier for multiplying said spread Q-channel signal by said cosine wave;

a first adder for adding an output of said first multiplier and an output of said second multiplier; and a second adder for adding an output of said third multiplier and an output of said fourth multiplier, thereby carrying out a complex multiplication of said spread I-channel data and said Q-channel data with said cosine wave and said sine wave, and outputting frequency offset I-channel data and frequency offset Q-channel data.

4. The code division multiple access transmitter as claimed in claim 1, wherein said frequency offset circuit comprises:

a first memory circuit for storing a product of said spread I-channel data and a cosine wave of a frequency corresponding to said designated offset frequency;

a second memory circuit for storing a product of said spread Q-channel data and a sine wave of the frequency corresponding to said designated offset frequency;

a third memory circuit for storing a product of said spread I-channel data and said sine wave;

a fourth memory circuit for storing a product of said spread Q-channel data and said cosine wave;

a first adder for adding data read from said first memory circuit and data read from said second memory circuit; and a second adder for adding data read from said third memory circuit and data read from said fourth memory circuit;

thereby carrying out a complex multiplication of said spread I-channel data and said Q-channel data with said cosine wave and said sine wave, and outputting frequency offset I-channel data and frequency offset Q-channel data.

5. The code division multiple access transmitter as claimed in claim 1, wherein said frequency offset circuit comprises:

a first memory circuit for storing a sum of a product of said spread I-channel data and a cosine wave of a frequency corresponding to said designated offset frequency, and a product of said spread Q-channel data and a sine wave of the frequency corresponding to said designated offset frequency; and a second memory circuit for storing a sum of a product of said spread I-channel data and said sine wave, and a product of said spread Q-channel data and said cosine wave, thereby carrying out a complex multiplication of said spread I-channel data and said Q-channel data with said cosine wave and said sine wave, and outputting frequency offset I-channel data and frequency offset Q-channel data.

6. A code division multiple access transmitter comprising:

a primary modulator for carrying out primary modulation of transmission information, thereby generating a primary modulated I (In-phase) signal and a primary modulated Q (Quadrature) signal;

spreading code generating means for generating a spreading code which corresponds to a channel, and has a frequency higher than a rate of said transmission information;

a secondary modulator for performing spread modulation of said primary modulated I signal and said primary modulated Q signal using said spreading code, thereby outputting spread I-channel data and spread Q-channel data;

a frequency offset circuit for offsetting a center frequency of said spread I-channel data and of said spread Q channel data by a designated offset frequency, thereby outputting frequency offset data; and a transmitting circuit for converting said frequency offset data into a transmitted signal, wherein said frequency offset circuit comprises:

a first signal generator for generating a cosine wave of a frequency corresponding to said designated offset frequency;

a second signal generator for generating a sine wave of the frequency corresponding to said designated offset frequency;

a first multiplier for multiplying said spread I-channel data by said cosine wave;

a second multiplier for multiplying said spread Q-channel data by said sine wave;

a third multiplier for multiplying said spread T-channel data by said sine wave;

a fourth multiplier for multiplying said spread Q-channel signal by said cosine wave;

a first adder for adding an output of said first multiplier and an output of said second multiplier; and a second adder for adding an output of said third multiplier and an output of said fourth multiplier, thereby carrying out a complex multiplication of said spread I-channel data and said Q-channel data with said cosine wave and said sine wave, and outputting frequency offset I-channel data and frequency offset Q-channel data, wherein said transmitter circuit comprises D/A converters for converting said frequency offset I-channel data and said frequency offset Q-channel data into analog signals, a quadrature modulator for quadrature-modulating a carrier by an analog I-channel signal and an analog Q-channel signal outputted from said D/A converters, and a frequency converter for converting an output signal of said quadrature modulator into the transmitted signal.

7. A code division multiple access receiver comprising:

a first frequency converter for frequency-converting a received signal into an IF (Intermediate Frequency) signal;

a quadrature detector for converting said IF signal into an I-channel baseband signal and a Q-channel baseband signal;

A/D converters for converting said I-channel baseband signal and said Q-channel baseband signal into digital signals;

a second frequency converter for converting an I-channel digital signal and a Q-channel digital signal outputted from said A/D converters into signals with a zero center frequency using a local signal of a designated offset frequency, a center frequency of said I-channel digital signal and of said Q-channel digital signal outputted from said A/D converters being offset;

a correlation detector for correlation-detecting output signals of said second frequency converter; and a demodulator for demodulating output signals of said correlation detector.

8. The code division multiple access receiver as claimed in claim 7, wherein said second frequency converter comprises:

a first signal generator for generating a cosine wave of said designated offset frequency;

a second signal generator for generating a sine wave of said designated offset frequency;

a first multiplier for multiplying said cosine wave with said I-channel baseband signal converted into the digital signal; and a second multiplier for multiplying said sine wave with said Q-channel baseband signal converted into the digital signal.

9. The code division multiple access receiver as claimed in claim 8, wherein said second frequency converter comprises lowpass filters for low-passing outputs of said first multiplier and said second multiplier.

10. The code division multiple access receiver as claimed in claim 8, wherein said second frequency converter comprises an automatic frequency control circuit connected to outputs of said first multiplier and said second multiplier.

11. The code division multiple access receiver as claimed in claim 7, wherein said second frequency converter comprises:

a low-suppress filter for suppressing low-frequency components of outputs of said quadrature detector;

sampling means for sampling outputs of said low-suppress filter at a clock frequency corresponding to a designated offset frequency; and a lowpass filter that low-passes outputs of said sampling means.

12. A code division multiple access system including a code division multiple access transmitter and a code division multiple access receiver, said code division multiple access transmitter comprising:

a primary modulator for carrying out primary modulation of transmission information, thereby generating a primary modulated I (In-phase) signal and a primary modulated Q (Quadrature) signal;

spreading code generating means for generating a spreading code which corresponds to a channel, and has a frequency higher than a rate of said transmission information;

a secondary-modulator for performing spread modulation of said primary modulated I signal and said primary modulated Q signal using said spreading code, thereby outputting spread I-channel data and spread Q-channel data;

a frequency offset circuit for offsetting a center frequency of said spread I-channel data and of said spread Q channel data by a designated offset frequency, thereby outputting frequency offset data; and a transmitting circuit for converting said frequency offset data into a transmitted signal, said code division multiple access receiver comprising:

a first frequency converter for frequency-converting a received signal into an IF (Intermediate Frequency) signal;

a quadrature detector for converting said IF signal into an I-channel baseband signal and a Q-channel baseband signal;

A/D converters for converting said I-channel baseband signal and said Q-channel baseband signal into digital signals;

a second frequency converter for converting an I-channel digital signal and a Q-channel digital signal outputted from said A/D converters into signals with a zero center frequency using a local signal of a designated offset frequency, a center frequency of said I-channel digital signal and of said Q-channel digital signal outputted from said A/D converters being offset;

a correlation detector for correlation-detecting output signals of said second frequency converter; and a demodulator for demodulating output signals of said correlation detector.

* * * * *